Feb. 28, 1967
E. BERNER
3,306,959
METHOD AND APPARATUS FOR JOINING ADJACENT
PANELS OF THERMOPLASTIC MATERIAL
Filed Oct. 11, 1962
4 Sheets-Sheet 1
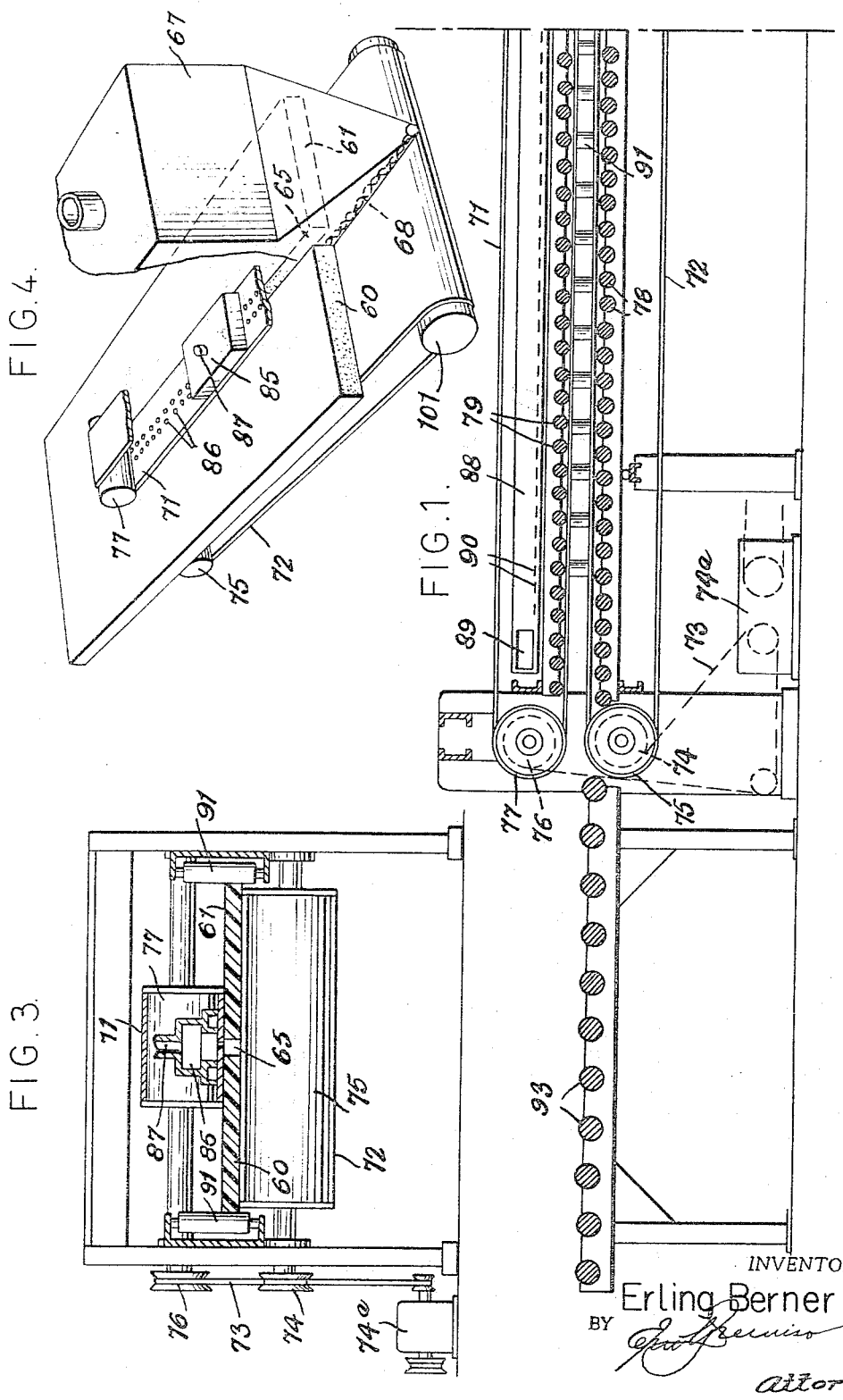
INVENTOR.
Erling Berner
BY
Attorney

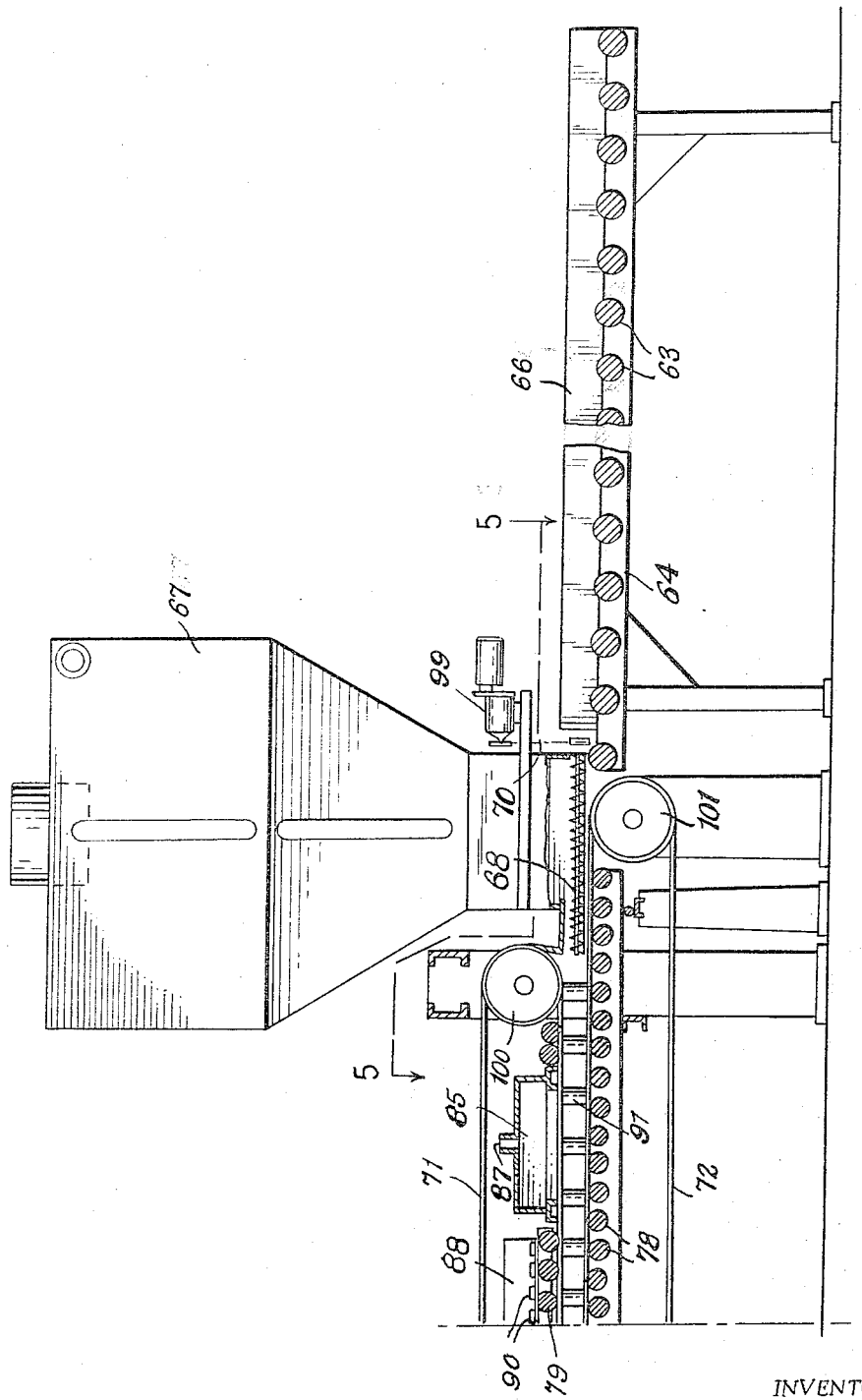

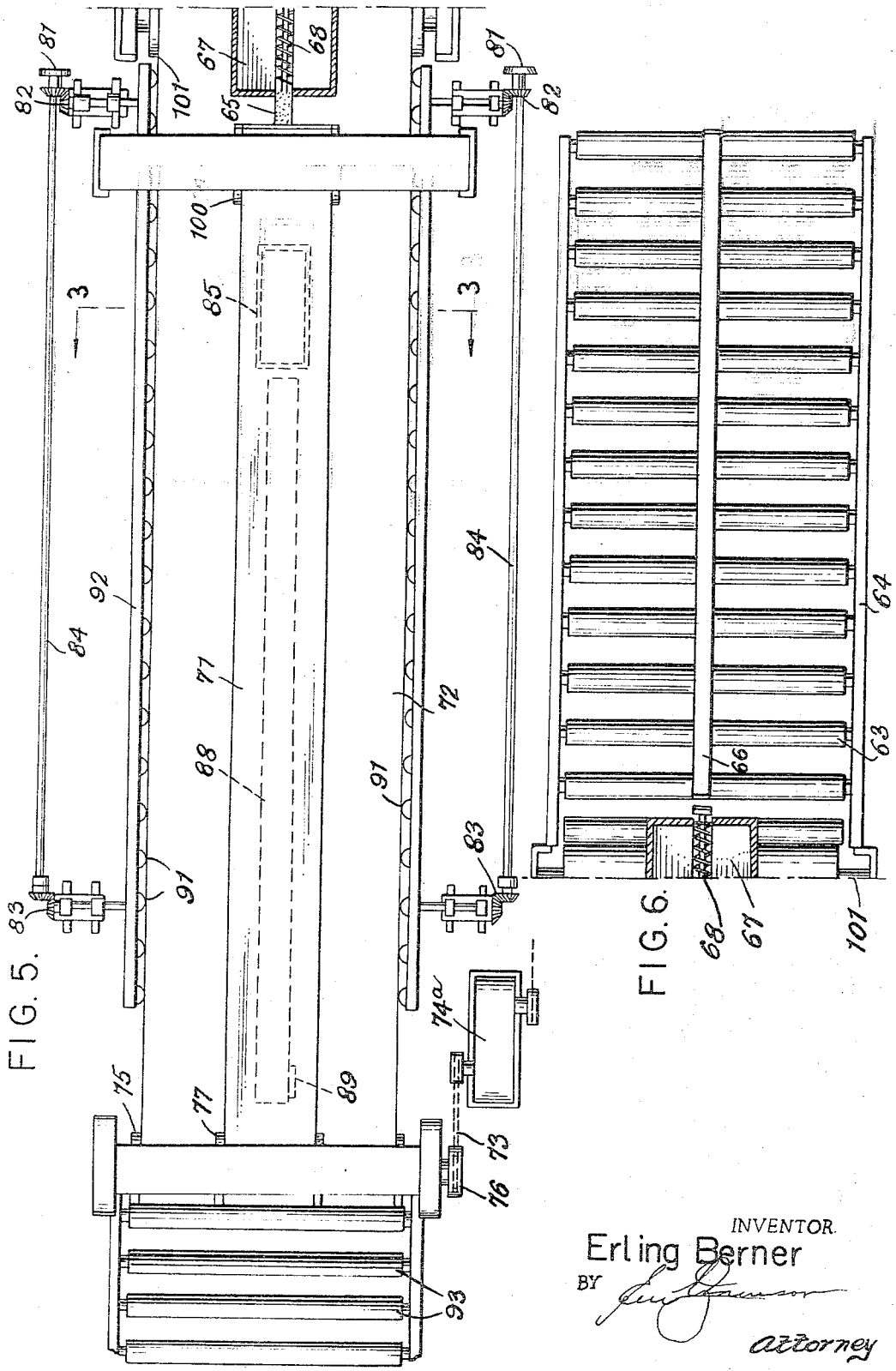

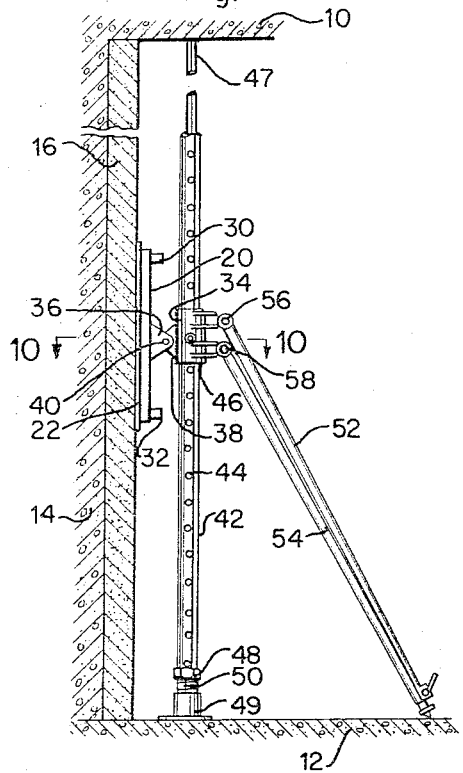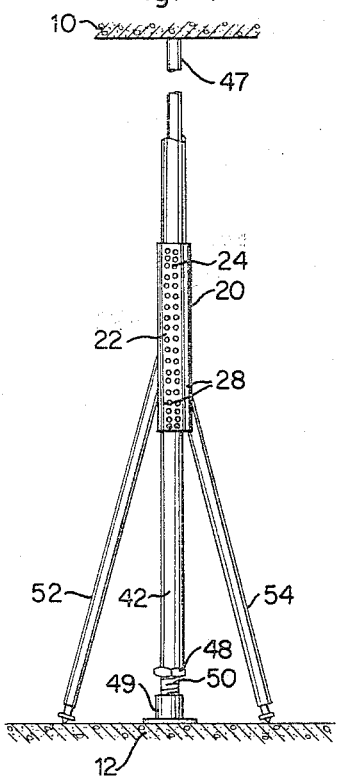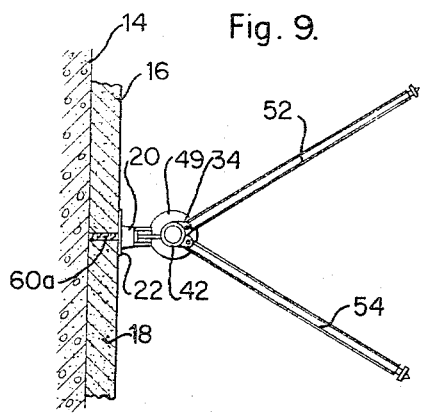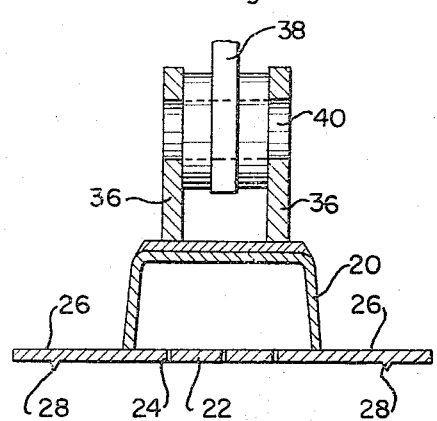

United States Patent Office 3,306,959
Patented Feb. 28, 1967

3,306,959
METHOD AND APPARATUS FOR JOINING ADJACENT PANELS OF THERMOPLASTIC MATERIAL
Erling Berner, New Castle, Pa., assignor to Isolerings-aktiebolaget WMB, Goteborg, Sweden, a corporation of Sweden
Filed Oct. 11, 1962, Ser. No. 229,917
Claims priority, application Sweden, Dec. 14, 1956, 11,397/56
3 Claims. (Cl. 264—46)

This application is a continuation-in-part of my co-pending application, Serial No. 702,696, filed December 13, 1957, now abandoned.

The present invention relates to a method and apparatus for uniting adjacent panels or strips preferably composed of thermoplastic material, such as expansible cellular polystyrene, and essentially a material of a porous nature having heat-insulating characteristics.

Panels of synthetic resin, such as polystyrene or vinyl composition may be given a porous or cellular structure with a resultantly low specific gravity which makes them particularly suitable for heat-insulating purposes. Thus, when it is desired to insulate a room or other enclosure, the panels are arranged in side-by-side relationship over the surfaces of the walls, ceilings or other parts of the room or enclosure.

It is generally recognized in connection with insulating materials, that even when such materials possess high insulating characteristics, that the meeting edges of the panels are likely to result in a crack or crevice that tends to reduce the insulating qualities at this point. It has been found that in actual practice, it is impossible to construct or mount insulating panels of the porous nature herein mentioned in a manner to prevent the formation of cracks or openings between the meeting edges of the panels. As a result, air can circulate in the cracks between the warm and cold sides of the wall and thus, by convection, a considerable loss of heat will result.

Efforts have been made to fill the cracks or joints between the panels by means of asphalt or similar adhesive materials, but the use of such materials has not been found entirely satisfactory.

According to the present invention, a method has been discovered which makes it possible to completely eliminate the cracks or joints between the panels regardless of the location and disposition of the cracks, or whether the adjacent edges of the cracks or joints extend angularly to one another. This desirable result, by means of which the adjacent edges of the panels are integrally united, is attained by filling the cracks or joints between the panels with porous granules of thermoplastic material, such as that of which the panels are composed, and which granules are caused by the application of heat to cohere to one another and to the edges of the panels. In addition to obtaining a considerably improved insulating effect, a wall, ceiling or other surface constructed according to the invention, will have a pleasing and attractive appearance, and if desired, the insulating layer may be utilized in a manner to permit the same to constitute the visible wall surface of the room.

In addition to filling or closing cracks or joints between adjacent wall panels when such panels have been mounted on a wall or ceiling, it has been found convenient and economical to manufacture panels or strips in relatively narrow widths and then unite them to thus produce relatively wide panels. The present invention therefore not only relates to a means and method for uniting the panels after the same have been mounted, but it also comprehends a method and apparatus for uniting the adjacent edges of unmounted panels to thereby produce panels of double width.

In the accompanying drawings, wherein illustrative embodiments of the invention are shown, FIG. 1 is a longitudinal vertical sectional view of an apparatus for uniting the adjacent edges of continuously-fed paneling;

FIG. 2 is a continuation of the right end of FIG. 1;

FIG. 3 is a sectional view, taken substantially on the line 3—3 of FIG. 5, looking in the direction of the arrows;

FIG. 4 is a perspective view showing somewhat diagrammatically, the operation of the apparatus;

FIG. 5 is a sectional view, taken substantially on the line 5—5 of FIG. 2, looking in the direction of the arrows;

FIG. 6 is a continuation of the right end of FIG. 5;

FIGS. 7 and 8 show another apparatus for carrying out the method according to the invention, the views being respectively, a side and front elevational view of such apparatus;

FIG. 9 is a top plan view of the apparatus of FIGS. 7 and 8, and

FIG. 10 is a partial horizontal cross-sectional view, taken substantially on the line 10—10 of FIG. 7, looking in the direction of the arrows.

Referring first to the simpler embodiment of the invention as shown in FIGS. 7 to 10, there is therein shown a ceiling or upper horizontal surface of a room or other chamber at 10; the floor is indicated at 12 and one of the walls is indicated at 14. The interior wall surfaces of the room are covered with insulating panels 16 and 18. These insulating panels are preferably composed of porous or cellular synthetic resin such as expanded polystyrene and may be produced in a known manner from granules which have been initially expanded to a porous condition and thereafter caused to cohere while in a mold or in a continuously-operating apparatus, by the introduction of heat, so that the granules agglutinize at their points of contact with one another During the agglutinization process the granules will additionally expand. An example of such plastic material is polystyrene which contains an expanding agent such as petroleum ether. The plastic plastic material so treated assumes the form of compact granules, when they are treated for example, by water will increase in volume up to fifty times or more. The method of producing this material is known per se and is therefore not herein discussed in detail.

The apparatus shown in FIGS. 7 to 10 for carrying out the improved method, includes an oblong box or casing 20 having a side wall 22 provided with one or more rows of perforations 24 extending longitudinally of the casing. As shown in FIG. 10, the perforations are in the wall 22 which may be provided with lateral extension or wings 26. These extensions may be provided with the ribs or projections shown at 28. At one end of the box or casing 20 is provided a pipe fitting 30, for the reception of one end of a hose for conveying a heating material, such as steam, from a suitable source of steam supply, to the interior of the box or casing 20. The opposite end of the box or casing 20 is provided with a discharge fitting 32 for the emergence of the steam condensation.

The box or casing 20 is pivotally connected to a sleeve 34 by means of ears 36 provided on the casing, and a pivot pin 40 extends through the ears 36 and also through the ear 38 provided on the sleeve 34. The sleeve 34 is slidably mounted on a tubular rod 42 which is provided with equally-spaced holes 44 which are selectively used for positioning the sleeve at any desired location on the rod 42, by means of the pin 46. Another rod 47 telescopically fits within the rod 42 and has at least one hole corresponding in size to the holes 44 for selective registration with any one of the holes 44, whereby the two rods 42 and 47 may be locked in an adjusted position by means of a pin inserted through the registered holes.

The two rods 42 and 47 are adjusted to a length somewhat less than the height of the room whose walls are to be covered by the insulating material. Then by means of a tightening device, such as the nut 48 and the threaded rod 50 engaging the foot 49, the telescoped rods may be caused to exert pressure against two opposite surfaces of the room, such as the floor 12 and the ceiling 10. For a more secure anchorage for the rod 42, a pair of legs 52 and 54 forming props may be articulatively connected to the sleeve 34 by means of the universal pivot joints 56 and 58. These legs may be extended telescopically and they angularly engage against the floor 12 to thereby support the rod 42 through the engagement of the sleeve 34 therewith.

In mounting the insulating panels 16 and 18, they are preferably so arranged that they do not actually abut against one another, but are slightly spaced apart as shown in FIG. 9, and to enable the filling material to be placed in the joint for the depth of the panels. The apparatus is positioned in from of the slot opening or joint between the panels and in such a position that the box or casing 20 will cover the joint. This slot opening joint or intervening space between the panels is now filled with a mass of thermoplastic granules as heretofore described, and as shown at 60*a* in FIG. 9. Thereafter steam is introduced through the fitting 30 into the box or casing 20, which steam escapes through the holes 24 in the wall 22 for entry into the interstices between the granules. The granules are thus heated in their surface layers so that they will become sintered, as will the edges of the panels. During this heating the granules will cohere intimately with one another and also with the edges of the panels. The box or casing 20 is maintained against the surface of the panels by a force sufficiently strong to resist the pressure produced by the expansion of the granles and thus prevents bulging at the joint between the panels. The extensions or wings 26 on the box or casing 20 extend laterally beyond the joint and act to distribute the pressure as well as prevent the steam from escaping laterally. The projections or ribs 28 cooperate in the performance of the last-mentioned function. It is important that the panels be held against sidewise movement relatively to their support so that they do not slide apart during the jointing and the expanding force applied. The joining together of the panels may begin at the floor and the box or casing 20 can be moved step-by-step along the rod 42 as the work progresses.

While it is herein suggested that the material joined by the improved method shall be of synthetic resin, the method described might be used in connection with other materials, such as cork for example, and to which the granules might be attached by means of a coating of adhesive applied to the adjacent edges of the panels. The box or casing 20 may be slidable with respect to the support if necessary, in order to provide counter-pressure when the granules swell. The means for supporting the rows 42 and 47 may, if necessary, be hydraulic or of other construction.

In FIGS. 1 to 6 inclusive is shown an apparatus by means of which continuously-fed panelling may have its adjacent longitudinally-extending, spaced apart edges joined by a filling of the expansible polystyrene granules. The two strips of paneling, indicated respectively at 60 and 61 are moved longitudinally from the right, as viewed in FIGS. 2 and 9 over conveying means consisting of rollers 63, rotatively supported in a frame 64. The two paneling strips 60 and 61 are maintained in space apart-relation, or with the spacing shown at 65 located between them, by means of a divider strip 66 rising vertically above the rollers 63 and extending down the center thereof.

Shown at 67 is a hopper containing the expansible granules and it is provided at its bottom or outlet end with a spiral feeder 68 so arranged and positioned that it is located in the spacing 65 between the paneling strips 60 and 61 as said strips are longitudinally moved. The spiral feeder 68 is rotated by a chain or belt 70 from a motor 99 having a variable speed arrangement.

As the two spaced paneling strips pass beneath the outlet of the hopper, the spiral feeder 68, located in the space 65 between the paneling strips and deposits granules therein as the paneling strips, with the space between them now filled with the granules, passes between the lower stretch of an upper belt 71 and the upper stretch of a lower belt 72. At one end, the belt 71 extends around a rotative drum 100 and at its opposite end it extends around drum 77.

The drive means for the belts is shown in FIG. 1 wherein a chain or belt 73 driving a pulley or sprocket 74 on the shaft of belt-drum 75, also passes around pulley or sprocket 76 on the belt drum 77. The lower belt 72 passes around the drum 75, and the belt or chain 73 is driven by a drive in the housing shown at 74*a*. The belt 72 extends at one end around the drum 101 and the upper stretch of the belt 72 is supported by rollers 78, while rollers 79 maintain the lower stretch of the upper belt under the required tension.

Provided above the lower stretch of the belt 71 is a steam chest 85 operative to direct steam down upon the belt and though the longitudinal lines of perforations 86 extending through the belt, and over and adjacent to the granule-filled space between the paneling strips. Steam is supplied into the steam chest through the inlet 87 from any suitable supply source. The upper belt 71 may be composed of stainless steel or of other non-corrosive material, while the lower belt 72 may be composed of some heat-resistant rubber or similar material.

To the left of the steam chest 85 is a cooling pipe or tube 88 through which a cooling fluid such as cold air is directed from a suitable source through the inlet 89 adjacent to one end of the pipe.

The pipe or tube 88 is provided at the bottom with outlets 90 through which the cold air is directed downwardly upon the filled joint between the paneling strips and adjacent edges of the strips.

From the foregoing, the operation of the apparatus shown in FIGS. 1 to 6 inclusive will be readily apparent. The two paneling strips 60 and 61 are moved along on the rollers 63 toward the filling means, with the division strip 66 interposed between them to thereby maintain the two strips in uniformly-spaced relation as they pass below the hopper and have the spiral feeder 68 enter into the space between them. As the belts 71 and 72 serve to move the two strips toward the left, as viewed in FIGS. 1 and 2, the spiral feeder 68 fills the space between the strips with the expansible granules, and the filled space, passing under the steam chest, subjects the granules in the space, as well as the adjacent edges of the panels which define such space, to the action of heat and moisture, and the pressure of the belts so that the granules are expanded and will cohere with one another and with the edges of the strips of paneling. The belts will prevent the rising of the granules out of the space between the paneling strips and the paneling strips are prevented from moving apart by being confined between side rollers shown at 91. The side rollers are mounted in bars 92 which are adjustable to and from one another for various paneling widths by means of gearing 82, 83, connecting rods 84 and the hand wheels 81.

After the paneling passes under the steam chest, it then passes under the cooling tube or pipe 88 and the material becomes set and the two paneling strips are integrally united. The united strips then pass from between the belts 71 and 72 and onto the rollers 93 from which the then wide panel is removed and severed into the required lengths.

Having thus described embodiments of the invention, it is obvious that the same is not to be restricted thereto, but is broad enough to cover all structures and methods coming within the scope of the annexed claims.

What I claim is:

1. The method of sealing the adjacent edges of wall paneling wherein a pair of panel strips formed of expansible cellular granules are mounted on a support with the said adjacent edges of said strips in spaced relation, comprising the steps of filling the space between the said edges of said strips with heat expansible granules containing an expanding agent which will cause expansion when subjected to heat, and restraining said panel strips at the edges thereof against movement relative to each other and in a direction normal to said support and also restraining the granules which are in said space within a plane defined by the outer surfaces of said panels, while simultaneously applying heat concentrated at the areas adjacent to said spaced edges of said strips, thereby expanding the granules of the strips and the granules in the space between said edges and joining said granules to form a cohesive, tight and substantially invisible joint between said panel strips.

2. The method of claim 1, wherein said joint is progressively and continuously made along the spaced side edges of said panel strips.

3. The method of claim 1, wherein said granules are of partially expanded polystyrene.

References Cited by the Examiner

UNITED STATES PATENTS

| | | | |
|---|---|---|---|
| 1,719,199 | 7/1929 | Schumacher | 156—500 |
| 2,323,963 | 7/1943 | Ames | 156—500 |
| 2,376,698 | 5/1945 | Irvine et al. | 50—533 |
| 2,744,042 | 5/1956 | Pace | 264—45 |
| 2,857,931 | 10/1958 | Lawton | 264—45 |
| 2,983,962 | 5/1961 | Merz et al. | 156—79 |
| 3,035,375 | 5/1962 | Williams | 50—533 |
| 3,159,514 | 12/1964 | McKnight et al. | 264—47 |

EARL M. BERGERT, *Primary Examiner.*

DOUGLAS J. DRUMMOND, *Examiner.*